Dec. 1, 1942.　　　　J. B. TEGARTY　　　　2,304,036
METAL INSERT FOR MOLDED PLASTIC ARTICLES
AND METHOD OF INSTALLING THE SAME
Filed July 18, 1939

INVENTOR.
JOHN B. TEGARTY
BY
HIS ATTORNEY.

Patented Dec. 1, 1942

2,304,036

UNITED STATES PATENT OFFICE 2,304,036

METAL INSERT FOR MOLDED PLASTIC ARTICLES AND METHOD OF INSTALLING SAME

John B. Tegarty, Buffalo, N. Y., assignor to The Standard Products Company, Port Clinton, Ohio, a corporation of Ohio Application July 18, 1939, Serial No. 285,095

5 Claims. (Cl. 18—59)

This application is a continuation in part of my prior application, Serial No. 172,128, filed November 1, 1937, which has matured into Patent No. 2,182,007, dated December 5, 1939.

The invention relates to a method of securing certain types of metal inserts in organic plastic molding and to an article of manufacture produced by the method.

An object is more effectively and economically to secure a metal insert in a molded article.

A specific object is fixedly to secure an insert in a molded article without having to place the insert in the mold cavity in which the molding of the plastic portion of the article is accomplished.

A more specific object is to provide an improved molded knob including a metal insert such as may be threaded for securing the knob to a metal rod or lever.

Other objects and the various distinctive features of the invention will become apparent from the following description of illustrative articles made partially from moldable material in accordance herewith and shown in the drawing in which.

Figures 5A, 5B, 5C:
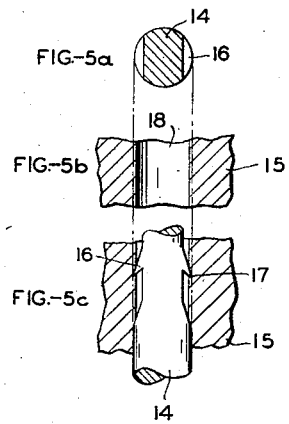
Figs. 5a, 5b and 5c are diagrammatic views illustrating certain relationships of parts in the course of assembly of a knob according to one manner of practicing the invention.
Figures 6A, 6B, 6C:
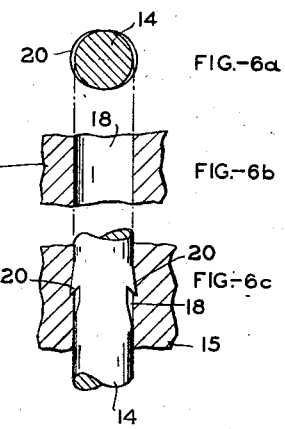
Figure 7:
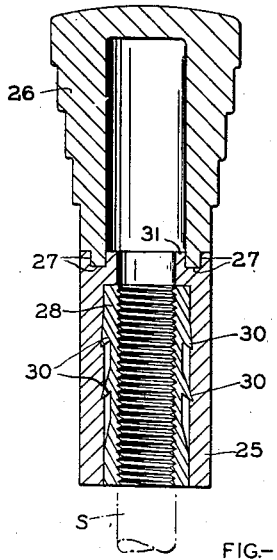
Figure 8:
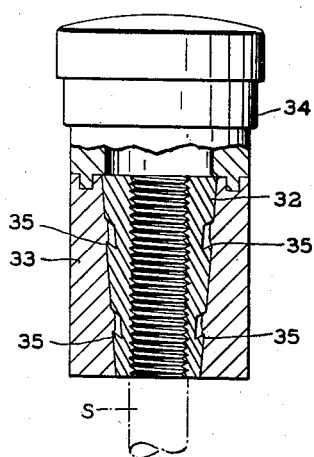

Figs. 6a, 6b, and 6c are views similar to Figs. 5a, etc., showing a modification;

Fig. 7 is a longitudinal, central sectional view of a modified two-piece knob and threaded insert thereof, and Fig. 8 is a view similar to Fig. 7 showing a still different form of knob and insert.

The present invention is concerned principally with the making of articles from moldable material of hard but non-rigid and non-brittle character at normal temperatures. An example is cellulose acetate. That and many other moldable materials has and have the property or characteristic known as cold flow. Metal inserts such as threaded sleeves adapted for attachment of the molded articles to rods, levers, etc., are ordinarily embedded in the plastic material during the molding process. That method requires special and often expensive means for supporting the inserts in the mold cavities and frequently makes ejection of pieces from the molds very difficult. More important still, when the inserts are embedded during the molding and certain of the molded pieces are found improperly formed, or otherwise defective, it then becomes very difficult, if not practically impossible, to salvage the plastic or the insert.

Again, when the articles are injection molded in sections, as for the sake of making them hollow to save weight or expense, and only one section of each complete article has a metal insert, the sections not having the inserts cannot effectively be formed from the same charge of fluent plastic and in the same gang mold with sections having such inserts. Such making of the complementary sections in sets secures greater uniformity of product and ensures the production of equal numbers of sections of each kind. Different charges are apt to vary in color or other desired appearance characteristics (e. g., mottled effects, striations, etc.) from other charges, and for that reason also it is highly desirable that the complementary sections of the articles be made from a single charge. In making such articles of thermoplastic material such, for instance, as cellulose acetate, the sections having the insert (embedded during molding) are cooled (by absorption of heat by the inserts) more rapidly than those having no inserts. It follows that either the sections with the inserts are inefficiently molded, because left in the mold longer than necessary, or the ones without inserts are not always left in the mold long enough to ensure that they are fully formed and uniformly solidified, and unlikely to sag or shrink in certain places after ejection from the mold.

A common occurrence with molded articles such as shown in Figs. 7 and 8, when made with inserts which are embedded during the molding, is that the upper section shrinks at its closed end wall, after ejection of the piece from the forming mold, leaving an uneven outer surface because insufficiently set while in contact with the mold cavity surfaces.

The present invention enables the production of complementary, e. g., knob parts, certain ones only of which require metal inserts, as for attachment purposes, at much higher efficiency and in fully matching sets of parts, and greatly reduces waste by enabling less expensive salvage of the plastic material of parts found defective.

Figure 1:
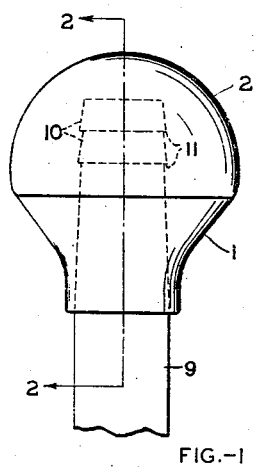
Fig. 1 is a side view of a gear shift lever knob and part of the lever, which latter forms the "insert"
Figure 2:
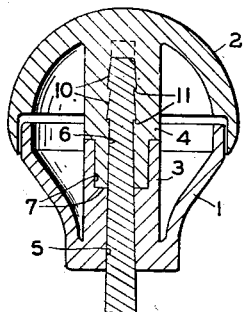
Fig. 2 is a longitudinal sectional view of the knob and lever portions as indicated at 2—2 on Fig. 1.
Figure 3:
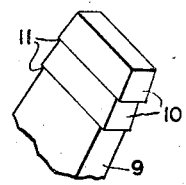
Fig. 3 is a fragmentary perspective view of the end portion of such lever.

Referring further to the drawing, Figs. 1 to 3 show a knob assembly according to the copending application identified above. The parts 1 and 2 are complementary shells with aligned telescoping central stem portions 3 and 4, axially recessed as at 5 and 6, and joined to each other as by cement or partial solvent for the plastic, or by other appropriate means at the joint 7. The axial recess 5 extends entirely through the central part 3, as shown, and the recess 6 is dead-ended in the knob part 2 and tapered toward the closed end on all sides. In carrying out the method hereof, the recess or bore of the part which is intended to interlock with the insert is originally molded with a smooth bore or recess adapted slidably to receive the insert. The shells and connecting thickened inner stem parts are molded from plastic material of non-brittle nature, and while hard enough to withstand considerable abuse and strain, nevertheless capable of cold flow.

The insert, for instance a gear shift lever 9, partially shown, may be a steel shaft generally complementary to the recesses 5 and 6 and having one or more ratchet-like tooth formations 10 thereon providing abrupt shoulders 11 facing the attached end of the lever. These tooth effects, as shown, are only on the tapered portion of the insert which enters the dead-ended recess 6 of the part 2. The recess is slightly undersize in relation to the insert when fully received into the recess; and, when the insert is driven into the knob assembly, as to the position shown, the hardened plastic by reason of the oversized relationship of the insert to the recess is forced to cold flow behind the abrupt shoulders 11, firmly locking the knob onto the insert. The lever end shown is rectangular in section and formation of the ratchet-tooth effects could be done as forging or milling operations. If the insert is circular in cross section, it can also be effectively turned on or rolled into the metal. Since the bore or recess of the portion 4 of the molded section 2 is smooth to start with and slightly undersized relative to the insert when fully received into the bore, the radially projecting parts (the tooth effects) of the insert maintain the plastic in compressed condition, thereby causing the material at the relatively indented portions of the insert (notch spaces behind the shoulders 11) to expand and at least partially fill the indentations, thus being maintained in interlocking relationship to the shoulders 11.

Figure 4:
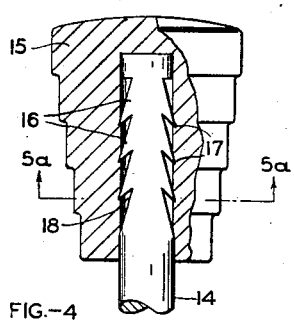
Fig. 4 is a view similar to Fig. 2 showing a modified insert and one-piece knob.

Fig. 4 illustrates a round metal rod 14 as the insert, and a one-piece molded knob 15. Stepped indentations are formed on opposite sides of the rod, providing ratchet tooth effects 16 with free, i. e. radially unsupported end portions 17 directed rearwardly of the insert or opposite from the direction in which the insert is driven into the knob. The teeth can be cut with a saw or milling cutter. If the hole 18 in the knob is only slightly smaller (e. g., .002″) than the rod, no likelihood of breaking the knob results from forcing in of the insert; and while the teeth go easily into place flexing slightly at their radially unsupported ends 17, they effectively resist withdrawal of the insert even though the plastic material is only slightly forced into the indentations which lie between the ratchet tooth effects.

In actual tests, rod stock such as shown breaks before the insert can be withdrawn. It will be seen that the flexure of the teeth and the cold flow of the hardened plastic over and behind the shoulders of the teeth cooperate in securing firm anchorage of the insert into the plastic.

Figs. 5a to 5c illustrate one set of circumstances and relationships in securing the firm anchorage above discussed. The rod 14 (section taken as indicated at 5a—5a on Fig. 4) is shown slightly larger than the hole or bore 18 as originally formed to receive the rod. As the insert including the teeth 16 passes through the bore, the wall of the latter is distorted radially, and immediately the plastic material cold flows and returns to original position behind the teeth. The teeth spring slightly inwardly toward the axis of the rod in going into place, but if an attempt is made to remove the insert, the teeth tend to sink farther into the plastic as will be apparent from Fig. 5c.

In Figs. 6a to 6c, the hole or bore is the same size as the rod, but the teeth 20 are turned out slightly beyond the periphery of the rod, yield slightly in going into place, but nevertheless cause the cold flowing of the plastic to anchoring position behind the teeth. The outward pressure of the ends of the teeth 20 on the wall of the bore or recess in the molded plastic is sufficient to cause such cold flow of material to behind the teeth 20.

Fig. 7 illustrates one manner of making a two-piece knob, wherein 25 is a shank piece and 26 a head piece. These parts can be secured together as by application of solvent to interfitting endwise adjacent surfaces of the molded pieces as at 27. The insert is an internally threaded sleeve 28 with the tooth effects thereon at opposite sides, as at 30. An annular shoulder at 31 can be used to arrest the insert in the desired position of insertion. A stem is diagrammatically shown at S, engaging the threads of the insert.

In the construction shown by Fig. 8, the insert 32 is smaller at its outer than at its inner end. Specifically, the sides of the insert converge toward the outer end of the two-piece molded knob shown as comprising sections 33 and 34. In this case the tooth effects 35, when the insert is driven in from the capped end of the insert, prevent return movement of the insert 32 (inward movement relative to the knob generally), while the taper prevents outward movement thereof.

It will be observed that the two parts of the knobs shown, respectively, by Figs. 7 and 8 can be made on common gang molds chargeable from the same source of supply and without having the operation of forming the sections 26 and 34 delayed by placement of inserts, and without having to sacrifice quality of molding because of heat differential occasioned by molded-in inserts, as already explained. Nevertheless, the inserts are more firmly anchored in the plastic than when molded in place with the usual roughened anchoring surfaces adjacent the plastic, because portions of the plastic adjacent the interlocking surface effects are maintained permanently in compression. Moreover, the molds are simplified since there is no problem presented by keeping the plastic from flowing into the internal threads or by the provision of means in the mold to support the inserts.

I claim:

1. The method of making articles of thermally moldable material capable of cold flow and with metal inserts, said method comprising molding the thermally moldable portion of the article with a smooth bore or recess, providing the insert with relatively yieldable ratchet-like teeth and forcing the insert in unheated condition into the bore or recess in a direction opposite the principal direction of inclination of the teeth, and meanwhile causing local distortion and cold flow of the moldable material away from the axis of the bore or recess adjacent the teeth and then behind the shoulders provided by the teeth.

2. The method of making articles of thermally moldable material capable of cold flow and with metal inserts, said method comprising molding the thermally moldable portion of the article with a smooth bore or recess, providing the insert principally with smooth surfaces substantially complementary to the bore or recess but relatively oversize with respect to the receiving portions of the bore or recess in the final position of the insert, and providing a yieldable indentation in the external surface of the insert, a wall of which indentation forms an abrupt shoulder facing axially of the insert, and forcing the insert in unheated condition into said undersize bore or recess from a direction opposite the direction of facing of the abrupt shoulder, whereby the moldable material is caused to enter the indentation and abut the shoulder to resist extraction of the insert.

3. The method of making articles of thermally moldable material capable of cold flow and with metal inserts, said method comprising molding the thermally moldable portion of the article with a smooth bore or recess, providing the insert with generally smooth surfaces approximately complementary to the bore or recess, and with ratchet-teeth effects which are under-cut so that the extremities of the teeth are yieldable toward the axis of the insert, maintaining a relationship between the transverse size of the bore or recess and the transverse size of the insert at the teeth such that the teeth tend to be sprung toward said axis of the insert in the desired position of the insert in said bore or recess, and forcing the insert in unheated condition axially into the bore or recess from a direction opposite the direction of undercutting of the teeth.

4. The method of securing metal inserts in thermally moldable material capable of cold flow at normal temperatures, said method comprising molding a smooth bore or recess in the thermally moldable material, providing the insert with short ratchet-like spring teeth, and forcing the insert in unheated condition into the bore or recess and concurrently causing the teeth to be deflected by the molded material and the molded material to be locally distorted by the teeth so as to cold flow to positions behind the teeth.

5. The method of securing a metal insert in an article, one part of which is of relatively hard thermally moldable material which will cold flow at normal temperatures, said method comprising molding said part with a smooth insert-receiving bore or recess, providing an insert which is generally complementary to the bore or recess in the fully seated position of the insert, the body portion of the insert being slightly undersize with respect to said recess but being provided with a relatively yieldable, ratchet-like projecting shoulder normally oversize with respect to said recess, urging said insert into said recess at normal temperature of said insert and said article whereby to cause the thermally moldable material to be locally compressed and to cold flow behind said shoulder when the insert is forced to final position, and forcing the insert into said final position.

JOHN B. TEGARTY.